UNITED STATES PATENT OFFICE.

THOMPSON HANNA, OF PITTSBURG, PENNSYLVANIA, ASSIGNOR OF ONE-HALF HIS RIGHT TO THOMPSON S. HANNA, OF SAME PLACE.

IMPROVEMENT IN THE MANUFACTURE OF WATER-PROOF VULCANIZED FIBER.

Specification forming part of Letters Patent No. 196,894, dated November 6, 1877; application filed October 13, 1877.

*To all whom it may concern:*

Be it known that I, THOMPSON HANNA, of Pittsburg, in the county of Allegheny, State of Pennsylvania, have invented certain new and useful Improvements in the Method of Manufacturing Vulcanized Fiber, relating to the waterproofing of the same; and I do hereby declare the following to be a full, clear, and exact description of the said invention, such as will enable those skilled in the art to carry it into effect.

This invention relates to improvements in the manufacture of what is known to the trade as "vulcanized fiber," and has reference particularly to a process by which the said vulcanized fiber is rendered impervious to moisture.

In the manufacture of this material, it has heretofore been found impossible to produce an article which would prevent the absorption of moisture, which, unless prevented, causes the material to swell up and soften to such an extent as to soon become comparatively useless, and lose its distinctive characteristics.

This difficulty I aim to overcome; and to that end my invention consists in submitting the article or the material to a bath of nitric or sulphuric acids, or their equivalent, as hereinafter fully described and claimed.

I have discovered that, if such vulcanized fiber, or the articles made therefrom, be submitted for from twenty-four to forty-eight hours in a bath of strong nitric acid, and then washed thoroughly in water, it is rendered almost absolutely impervious to moisture in any degree, and thus the material becomes available for many purposes to which it has not hitherto been applicable. The length of time of submersion is determined by the thickness of article under treatment; the thicker it is, the longer the time required to permeate its substance.

On account of the difficulty of obtaining nitric acid of sufficient strength, I have found that it is preferable to use a mixture of nitric and sulphuric acids, the proportions depending upon their respective strength.

Though I have mentioned nitric or sulphuric acids as the preferable agents, or a mixture of the two, I do not confine the scope of my invention to their specific use, as a mixture of sulphuric acid and nitrate of potash, or a vapor-bath of the fumes arising in the manufacture of bisulphate of potash, or other equivalents, may all be found available under different circumstances, and all are but modifications of my invention.

What I claim, and desire to secure by Letters Patent, is as follows:

1. The within-described method of rendering vulcanized fiber water-proof or moisture-proof, consisting in submitting it to a bath of nitric acid, or its described equivalents, substantially as specified.

2. As a new article of manufacture, vulcanized fiber having its substance moisture-proof.

In testimony whereof I have hereto set my hand this 10th day of October, A. D. 1877.

THOMPSON HANNA.

Witnesses:
T. S. HANNA,
T. J. McTIGHE.